United States Patent [19]
Gust

[11] 3,860,437

[45] Jan. 14, 1975

[54] METHOD FOR PRODUCING REFRACTORY CARBIDE COATINGS ON GRAPHITE

[75] Inventor: William H. Gust, Lafayette, Calif.

[73] Assignee: The United States of America as represented by the United States Atomic Energy Commission, Washington, D.C.

[22] Filed: Mar. 10, 1959

[21] Appl. No.: 798,553

[52] U.S. Cl. .............. 117/46 CC, 176/82, 117/95, 117/228, 117/DIG. 11
[51] Int. Cl. ............................................. B44l 5/12
[58] Field of Search ............ 117/118, 228, 221, 95, 117/46, DIG. 11; 29/474.1, 474.2, 474.3, 474.4, 471.1, 528, 423; 204/193.38; 176/82

[56] References Cited
UNITED STATES PATENTS

| | | | |
|---|---|---|---|
| 679,803 | 8/1901 | Voelker | 117/118 X |
| 1,568,369 | 1/1926 | Everett | 29/423 |
| 2,030,695 | 2/1936 | Erber | 117/118 X |
| 2,876,139 | 3/1959 | Flowers | 117/118 X |
| 2,910,379 | 10/1959 | Gurinsky | 117/118 X |
| 2,929,741 | 3/1960 | Steinberg | 117/118 X |

*Primary Examiner*—Harvey E. Behrend
*Attorney, Agent, or Firm*—John A. Horan; F. A. Robertson

EXEMPLARY CLAIM

1. The process for coating graphite with an adherent, continuous layer of metallic carbide comprising the steps of disposing a quantity of a refractory, carbide forming metal to be carburized in a contiguous, generally spaced relation with a smooth graphite surface, said spacing being sufficient to permit flow of a gas between said surface and said metal, enclosing said assembly with a nonreacting gaseous atmosphere containing methane, heating said assembly to a temperature above the decomposition point of said methane and slightly above the softening point of said metal, whereby a quantity of said methane undergoes pyrolysis and deposits carbon on said graphite and said metallic surfaces, and quickly raising the temperature of said assembly to a point at which carburization occurs.

12 Claims, 1 Drawing Figure

PATENTED JAN 14 1975
3,860,437
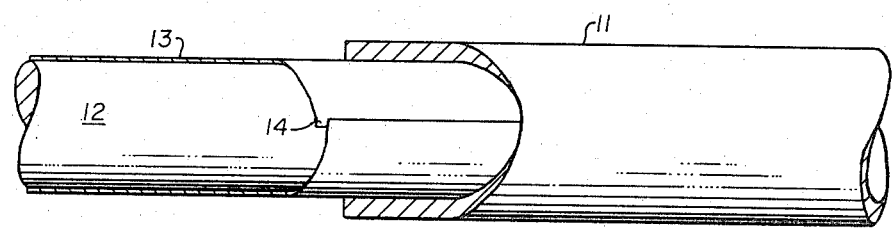
INVENTOR.
WILLIAM H. GUST
BY
Roland A. Anderson
ATTORNEY.

METHOD FOR PRODUCING REFRACTORY CARBIDE COATINGS ON GRAPHITE

This invention relates to superior and improved methods for producing refractory metallic carbide coatings on graphite. More particularly, this invention relates to an improved method for carburizing refractory metals onto graphite surfaces, particularly onto the interiors of graphite tubes, employing a particular atmospheric condition which promotes the formation of an adherent coating.

In the present age of nuclear reactors, high speed missiles and jet or rocket propulsion engines and many other technological fields there are ever increasing needs for refractory structures and surfaces which are stable and retain strength at much higher operating temperatures than heretofore employed and often in the presence of oxidizing or reducing atmospheres, ionizing radiations, high pressures or vacuums, and other severe and unusual conditions which ordinary materials of construction will not withstand. Graphitic carbon is a material which admirably satisfies many of the necessary requirements in this field. Graphite possesses highly desirable properties including low density, high melting or sublimation point and high structural strength at higher temperatures, permitting its use where most other structural materials, including common metals, are not satisfactory. In addition, graphite has a low neutron absorption cross-section while possessing adequate moderating capacity required in nuclear reactors and associated systems.

However, the normal properties of graphite are inadequate in certain respects and in particular environments. Graphite erodes and corrodes at high gas pressures, velocities and temperatures. Many gases and other materials react with graphite or are absorbed in an undesirable manner in certain environments. To alleviate this difficulty, in nuclear reactors, for example, graphite moderator blocks have been contained within a nonreactive metal such as a zirconium or aluminum to prevent absorption of or reaction with the coolant. However, in gas cooled reactors and especially in mobile, lightweight compact reactors having single piece graphite cores, this form of construction is disadvantageous due to bulk, low structural strength and other factors.

In addition to the problem of finding or selecting a graphite coating which has the desired properties, there is also the problem of applying the coating in such a manner that an adhesive bond between the graphite and the coating will be obtained. With carbide coatings the metal is of necessity generally placed upon the graphite by one of the prior art methods and then carburized in place. In the past this has placed severe limitations on the several materials known to have good coating properties, since many of the metals either cannot be dispersed properly over the graphite or else uneven or nonadherent coatings result.

In the present improved method for the formation of a carbide coating on graphite the carburization is greatly promoted by the addition of methane or other carbonaceous gases at the carbon-metal interface during the melting and carburization of the metal. Any method of the prior art involving contact carburization may be used, but a method particularly adaptable to use in the present invention is "graphite mandrel" method described in copending U.S. Patent Application Ser. No. 798,555 filed Mar. 10, 1959, William H. Gust, Richard A. Heckman and Wallace E. Voreck, Method for Producing Refractory Carbide Coatings on Graphite. In the method described in the above-named application the metallic carbide coating is produced by applying heat to a metallic foil or sheet held in contact with the inside surface of a graphite tube by a graphite mandrel or other support under proper conditions of vacuum or inert atmosphere in a critical heating sequence. The foil melts and penetrates the graphite pore system and is subsequently carburized, forming a bond with both the tube and the mandrel, which is removed by mechanical means. In the present improved method an inert atmosphere containing methane is provided during the heating sequence; the methane decomposes and promotes the formation of an adherent coating, probably by a mechanism involving both the coating of the graphite with carbon and the diffusion of carbon into the softened or melted metal. Other carburization methods than the mandrel method, such as carburization of powders in situ, may be similarly adapted to the use of an atmosphere containing a carbonaceous gas.

Using the mandrel method with an inert atmosphere containing methane gas, zirconium carbide coatings can be prepared which by visual inspection and mechanical tests are shown to be more tenacious than those similarly prepared without the use of the methane in a similar inert atmosphere. The methane-produced coatings are superior in that thicker coats with better adhesion are obtained because the free carbon from the decomposed methane reacts with the zirconium to form ZrC. This reaction is hypothesized to slow the diffusion of the melted zirconium into the adjacent graphite thus retaining the zirconium at the desired region. The hypothesis is borne out by the fact that thicker coatings are obtained and that Zr migration is reduced.

Accordingly, an object of the invention is to provide adherent, refractory, metallic carbide coatings on graphite surfaces, and a method of producing same.

A further object of the invention is to provide metallic niobium, molybdenum, and zirconium carbide coatings on graphite for use in high temperature erosive and corrosive environments and in high temperature gas cooled nuclear reactors.

Another object of the invention is to provide an improved mandrel method for coating graphite tubes with a tenacious bonded layer of a refractory metallic carbide.

Another object of the invention is to provide a method for coating graphite with a refractory layer of a metallic carbide using an inert atmosphere containing methane or other carbonaceous gas which promotes formation of an adhesive bond during carburization of a metal in situ.

Another object of the invention is to provide an improved mandrel method for coating graphite tube surfaces with a refractory layer of zirconium carbide in which carbon is deposited onto graphite and zirconium metal from a surrounding inert atmosphere containing methane during the critical metal melting step, whereby formation of a tenacious coating is promoted.

Additional objects and advantages will be seen from the following description, examples and FIGURE.

The FIGURE is a perspective view, partly cut away, showing a graphite tube with the mandrel and foil thereon partly inserted.

The graphite structures 11 or surfaces to be coated, as seen in the FIGURE, are provided or fabricated in accordance with conventional practices. For example reactor components such as tubes may be machined graphite of the usual reactor grades. In certain gas cooled reactors, uranium impregnated graphite cores having a multitude of gas coolant passages or channel are employed. A coolant or exhaust gas such as $H_2$, $CH_4$, $NH_3$, or $N_2$ is passed through the channel while the reactor core is operating and is thereby heated to a highly elevated temperature.

There is also provided a metal foil or sheet of zirconium or other metal commonly used with the mandrel method, e.g., molybdenum or niobium, of commercial grade purity and from 1 to 20, preferably 5 mils thick. A graphite mandrel 12 is supplied which is constructed of a grade of graphite preferably the same as that being coated. As may be seen from the cut away portion of the FIGURE, the foil 13 is wrapped tightly around the mandrel in overlapping relation indicated by 14 and the mandrel inserted into the bore or tube so that there is about a one mil tolerance between the foil and the surface to be coated. Preferably the materials are first cleaned with an organic solvent to remove grease and loose dirt, although this step may be omitted where the materials are known to be clean from previous history. The mandrel and foil should be carefully fitted to preclude the possibility of wrinkles or irregularities which might result in disruption of the surface continuity of the resulting coating. The assembly is then placed in an induction, resistance, or other high temperature furnace equipped to have a controlled atmosphere. Alternatively, when only tubes are to be coated, one end of each tube may be equipped with an adapter for the continuous flow of preselected gases into the bore; heat may be provided by resistance heating of the graphite itself.

Since the advantage of the invention lies in the promotion of an adherent coating during the heating of the methane to a temperature above its point of decomposition, means other than the mandrel may be used to position the metal in contact with the graphite surface to be coated. For example, metallic powders may be disposed about a horizontal graphite surface, or metal foils may be clamped into position on smooth surfaces with a second graphite piece shaped to mate the first piece at all points. Pressure between the surfaces in each instance should be regulated to permit permeation therebetween by the methane, as in the mandrel embodiment, where there is maintained about a one mil tolerance between the foil and tube.

After positioning of the metal, a nonreactive gas, such as helium or nitrogen, is next flushed through the assembly to remove atmospheric oxygen and, to some extent, chemi-adsorbed gases. Heating below the melting point of the metal and pumping down also serve to remove these undesirable materials, but satisfactory results may generally be attained without heating. A purge time of 30 minutes has been found to be sufficient for this step, although the time is not thought to be critical. A quantity of methane is now introduced into the purge gas, or alternatively methane may be used in the flushing step also. For optimum results 10-20% methane is used. Any carrier gas may be used with the metallic foil but superior results are obtained with specific gases for each metal: with molybdenum foils 5-15% hydrogen in helium is preferred, with niobium foils nitrogen is preferred, and with zirconium helium is preferred. Substantially similar results are believed possible with other carbonaceous gases. After an equilibrium time of about 5 minutes carburization may be undertaken.

During carburization sufficient gas pressure is maintained within the furnace or tube to insure the presence of an adequate amount of methane to promote carburization. An inert gas pressure of about 50 lb/in$^2$ is satisfactory where the partial methane pressure is of the order of 5 psig. This quantity is only known empirically and does not preclude higher methane pressures. Lower methane pressures also produce results superior to those in which no methane is present; data indicate that the methane or its decomposition products may act as a catalyst when it is used in quantities too small to account for the superior results by carbon deposition alone.

In the carburization step, the furnace is first heated to a temperature slightly above 1,700° C, thereby decomposing at least some of the methane. Although the exact pyrolysis mechanism is not understood, carbon deposits may be observed. The metals zirconium, niobium and molybdenum all tend to soften and melt above this temperature and the deposited carbon is thought to diffuse through them. A temperature of 1,800° C is used with respect to zirconium and other optimum temperatures may be established for niobium and molybdenum. A diffusion time of the order of 10 minutes is sufficient, after which the temperature is raised quickly to the point at which carburization takes place, usually above 2,100° C for the three metals listed.

Upon dismantling the assembly or removal of the tube from the furnace there will be found a graphite tube in which the mandrel is completely bonded to the interior thereof by the carburized metal coating. The mandrel must therefore ordinarily be removed therefrom by mechanical means, e.g., sandblasting, drilling, etc.

EXAMPLE

A 5 mil zirconium metal foil was wrapped carefully once around a graphite mandrel in overlapping relation and inserted into a close fitting graphite tube. There was about 1 mil tolerance between the surface of the bore and the foil. The graphite surfaces had been first cleaned with a solvent, tertiary butyl alcohol. The assembly was placed into a carbon resistance furnace, using the graphite tube as an electrode. The furnace was evacuated to a pressure of 100 microns three times for 5 minutes each, being flushed with helium after each evacuation, and then pressurized with 50 psig helium containing methane of about 5 psig partial pressure. Current was applied to the furnace and the graphite tube was baked for 12 minutes at 1,925° C. The temperature was then raised to 2,165° C for 8 minutes, causing the metal coating to carburize. After cooling the tube was removed from the furnace. The mandrel was removed from the tube by destructively drilling it. There resulted a tenacious, even coating which could not be separated from the graphite without destruction of the carbide-graphite boundary region. The coating was visually thicker and more adherent than coatings produced under identical conditions except for the presence of the methane gas; this superior structure and thickness was determined by visual and X-ray examination of longitudinally sawed tubes, the examination showing that the zirconium carbide coatings were thicker than those formed in a hydrogen-helium atmosphere.

While the invention has been described with respect to several preferred embodiments, it will be apparent to those skilled in the art that numerous variations and modifications may be made within the spirit and scope of the invention and thus it is not intended to limit the invention except as defined in the following claims.

What is claimed is:

1. The process for coating graphite with an adherent, continuous layer of metallic carbide comprising the steps of disposing a quantity of a refractory, carbide forming metal to be carburized in contiguous, generally spaced relation with a smooth graphite surface, said spacing being sufficient to permit flow of a gas between said surface and said metal, enclosing said assembly with a nonreacting gaseous atmosphere containing methane, heating said assembly to a temperature above the decomposition point of said methane and slightly above the softening point of said metal, whereby a quantity of said methane undergoes pyrolysis and deposits carbon on said graphite and said metallic surfaces, and quickly raising the temperature of said assembly to a point at which carburization occurs.

2. A process for reacting graphite with a refractory metal to produce an adherent, continuous layer of metallic carbide comprising the steps of disposing a quantity of a metal selected from the group consisting of molybdenum, zirconium, and niobium in contiguous, generally spaced relation with a smooth graphite surface, said spacing being sufficient to permit flow of a gas between said surface and said metal, degassing said assembly, enclosing said assembly with a nonreactive gaseous atmosphere containing less than about 20% methane, heating said assembly to a temperature of above about 1,700° C, whereby a quantity of said methane decomposes, and quickly raising the temperature of said assembly to a point at which carburization occurs.

3. A process for coating graphite with an adherent, continuous layer of metallic carbide comprising the steps of disposing a sheet of metal foil selected from the group consisting of molybdenum, zirconium, and niobium in a contiguous generally spaced relation with a smooth graphite surface, said spacing being sufficient to permit flow of a gas between said surface and said metal, heating and degassing said assembly at a temperature below 1,700° C, enclosing said assembly within a nonreactive gaseous atmosphere containing 10 to 20% methane, heating said assembly to a temperature of above about 1,700° C, whereby a quantity of said methane decomposes, and quickly raising the temperature of said assembly to a point at which carburization occurs, cooling and removing said assembly from said furnace.

4. The process of claim 3 in which the metal foil is held in contiguous gas permeable relation with said graphite piece by means of a second graphite piece.

5. The process of claim 3 in which the metal foil is zirconium and said nonreactive gas is helium.

6. The process of claim 3 in which the metal foil is niobium and said nonreactive gas is nitrogen.

7. The process of claim 3 in which the metal foil is molybdenum and said nonreactive gas is 5–15% hydrogen in helium.

8. A process for coating a graphite tube with an adherent, continuous layer of zirconium carbide comprising the steps of disposing a sheet of zirconium metal tightly and evenly about a graphite mandrel, said mandrel being sized for a close tolerance between said foil and said bore when inserted therein together with said foil, inserting said foil and mandrel within said tube, degassing said assembly at a temperature below 1,700° C, enclosing said graphite-metal interface within a nonreactive gaseous atmosphere containing 10 to 20% methane, heating said assembly to a temperature of about 1,700° C, whereby a quantity of said methane decomposes, quickly raising the temperature of said assembly to a point at which carburization occurs, cooling and removing said tube from said furnace, and removing said mandrel from said tube by mechanical means.

9. The process of claim 8 in which said zirconium foil about said mandrel is within the range of from 1 to 20 mils thick.

10. The process of claim 8 in which a tolerance of about 1 mil exists between the zirconium foil and the tube prior to decomposition of the methane.

11. The process of claim 8 in which the partial pressure of the methane is at least 3 to 5 psig.

12. A process for coating a graphite tube with an adherent, continuous layer of zirconium carbide comprising the steps of disposing a sheet of zirconium metal 1 to 20 mils thick about a graphite mandrel, said mandrel being sized for a tolerance of the order of 1 mil between said foil and said tube when inserted therein together with said foil, inserting said foil covered mandrel within said graphite tube, evacuating said assembly to a pressure of 100 microns Hg, flushing said assembly with helium, repeating said evacuating and flushing steps at least two times, pressurizing said assembly with helium of about 50 psig combined with methane of about 5 psig, heating said assembly for about 9 minutes at about 1,800° C, whereby at least part of said methane decomposes and deposits carbon on said tube and said foil, thereafter raising the temperature to about 2,100° C for a time of the order of at least 5 minutes, whereby the metal coating carburizes, cooling and removing said tube from said furnace, and removing said mandrel from said tube by mechanical means.

* * * * *